(12) United States Patent
Hoetzel

(10) Patent No.: US 8,656,762 B2
(45) Date of Patent: Feb. 25, 2014

(54) METHOD FOR DETECTING A ROTATION ANGLE

(71) Applicant: dSpace digital signal processing and control engineering GmbH, Paderborn (DE)

(72) Inventor: Wolfgang Hoetzel, Salzkotten (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 0 days.

(21) Appl. No.: 13/661,871

(22) Filed: Oct. 26, 2012

(65) Prior Publication Data

US 2013/0104635 A1    May 2, 2013

(30) Foreign Application Priority Data

Oct. 28, 2011    (DE) .......................... 10 2011 054 933

(51) Int. Cl.
*G01M 15/06*    (2006.01)
(52) U.S. Cl.
USPC ..................................... 73/114.26; 73/114.27
(58) Field of Classification Search
USPC .......................................... 73/114.26, 114.27
See application file for complete search history.

(56) References Cited

U.S. PATENT DOCUMENTS

| 4,506,339 | A | 3/1985 | Kühnlein |
| 4,715,009 | A | 12/1987 | Böhmler et al. |
| 5,434,800 | A | 7/1995 | Davis et al. |
| 5,497,748 | A | 3/1996 | Ott et al. |
| 6,208,131 | B1 | 3/2001 | Cebis et al. |
| 6,727,686 | B2 | 4/2004 | Beckmann et al. |
| 7,104,119 | B1 | 9/2006 | Trapasso et al. |
| 7,197,391 | B2 | 3/2007 | Kunibe et al. |

(Continued)

FOREIGN PATENT DOCUMENTS

| DE | 34 23 664 A1 | 1/1986 |
| DE | 41 33 570 C1 | 12/1992 |

(Continued)

OTHER PUBLICATIONS

Emerson et al., Using the Engine Position (CRANK and CAM) eTPU Functions, Freescale Semiconductor, Application mark (AN3769), pp. 1-26 (Jun. 2009).

(Continued)

*Primary Examiner* — Freddie Kirkland, III
(74) *Attorney, Agent, or Firm* — Muncy, Geissler, Olds & Lowe, PLLC

(57) ABSTRACT

A method for detecting a first rotation angle of a first shaft of an engine is provided, whereby a first marking carrier with sensor-readable markings is provided, whereby the markings form a first marking pattern that has marking sections having at least one first and a second marking section. The first marking carrier is scanned by a first sensor and a first sensor signal is generated. The first sensor signal is modulated by the markings on the marking carrier. A correlation between a time course of the first sensor signal and a time signal is made by a computing unit. A first marking section is recovered from the first sensor signal by the computing unit, and then, a first exclusion criterion for excluding the first stored marking section is determined from the recovered first marking section. The first stored marking section is then excluded by the first exclusion criteria.

20 Claims, 4 Drawing Sheets

(56) References Cited

U.S. PATENT DOCUMENTS

| | | | |
|---|---|---|---|
| 7,819,106 B2* | 10/2010 | Kondo | 123/406.6 |
| 7,942,041 B2* | 5/2011 | Takeuchi | 73/114.26 |
| 8,136,258 B2* | 3/2012 | Albert et al. | 33/1 PT |
| 8,204,674 B2* | 6/2012 | Kondo | 701/114 |
| 8,302,466 B2* | 11/2012 | Shimizu | 73/114.27 |
| 2010/0281699 A1 | 11/2010 | Albert et al. | |

FOREIGN PATENT DOCUMENTS

| | | |
|---|---|---|
| DE | 43 28 584 A1 | 3/1994 |
| DE | 10 2008 038 960 A1 | 2/2001 |
| DE | 10 2004 045 191 B3 | 5/2006 |
| DE | 10 2004 053 156 A1 | 5/2006 |
| DE | 10 2006 002 923 A1 | 9/2006 |
| DE | 10 2007 024 416 A1 | 11/2008 |
| WO | WO 01/48488 A2 | 7/2001 |

OTHER PUBLICATIONS

"Rotary Encoder", Wikipedia, http://en.wikipedia.orq/wiki/Rotary_encoder, pp. 1-7 (2011).

European Search Report for European Application No. EP 12 18 4008 dated Jan. 30, 2013 with English translation.

* cited by examiner

FIG. 4
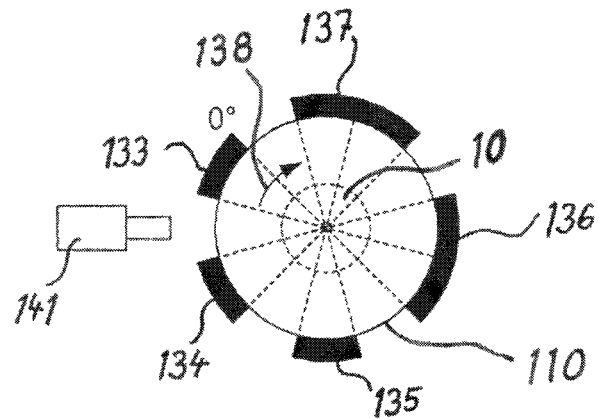
FIG. 4A
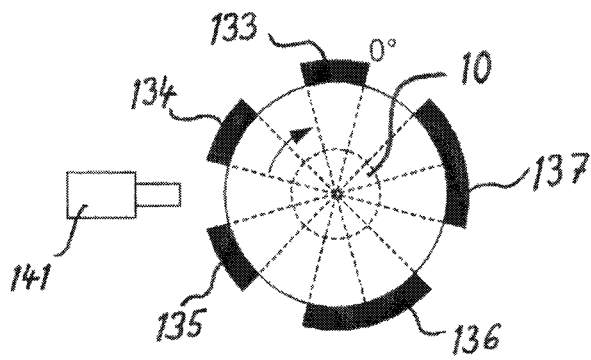
FIG. 4B
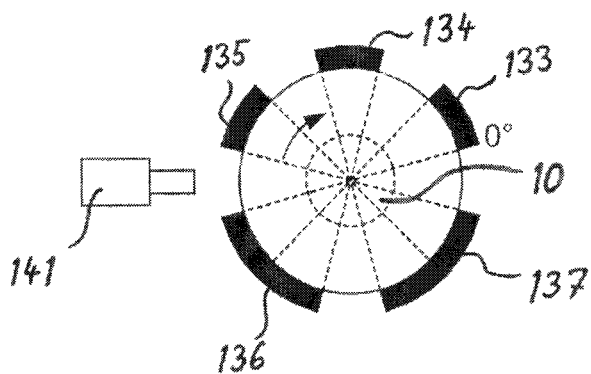
FIG. 4C
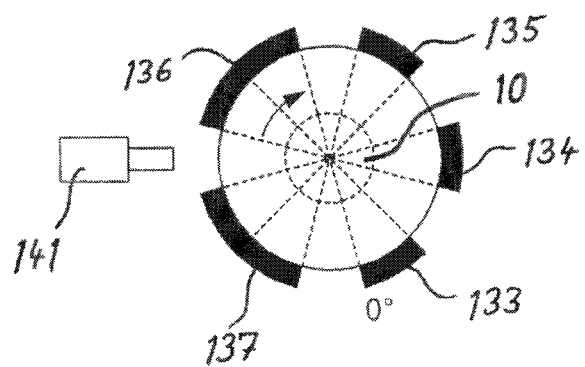
FIG. 4D

METHOD FOR DETECTING A ROTATION ANGLE

This nonprovisional application claims priority under 35 U.S.C. §119(a) to German Patent Application No. DE 10 2011 054 933.1, which was filed in Germany on Oct. 28, 2011, and which is herein incorporated by reference.

BACKGROUND OF THE INVENTION

1. Field of the Invention

The invention relates to a method for detecting a rotation angle.

2. Description of the Background Art

A rotary encoder which could be connected to a shaft of an engine is known in the conventional art. The encoder offers the option of determining a rotation angle that is divided into sectors. It could be provided hereby to scan concentrically arranged sector regions of a circle segment of a circular encoder disk simultaneously by a number of sensors. Disadvantages of the rotary encoder are in particular that, on the one hand, a number of sensors are absolutely necessary and, on the other, the arrangement of the encoder disk and associated sensors requires a high structural effort, particularly in regard to adherence to fabrication tolerances, which depends on the required maximum allowable rotation angle measurement error of the encoder system.

It is known from the document "Application-Note, Using the engine position (crank and cam) eTPU functions" by G. Emerson (East Kilbride), Freescale Semiconductor, pages 2 and 3, Section 3, to use a toothed wheel with 35 teeth to detect the rotation angle of the drive shaft of a machine. The toothed wheel has at a predetermined position a tooth gap, whereby the tooth gap could be used as a feature for the start point or end point of a rotation of the toothed wheel and the drive shaft. A sensor could be used for scanning the teeth and the tooth gaps. This technical solution has the following disadvantage in particular: On the one hand, depending on the position of the tooth gap in the worst case, the time between initialization and the provision of information on the rotation angle of the drive shaft is relatively long, namely, when, for example, after the initialization process, for example, during starting of the machine, almost a complete rotation of the shaft is necessary to bring the tooth gap to the sensor.

SUMMARY OF THE INVENTION

It is therefore an object of the invention to provide a method that refines the state of the art.

According to an embodiment of the invention, a method is provided for detecting a first rotation angle of a first shaft of an engine, whereby a first marking carrier with sensor-readable markings is provided. The markings form a first marking pattern that has marking sections having at least one first marking section and a second marking section. The first marking carrier is caused to rotate by the first shaft, and there is a proportionality between the rotation angle of the first shaft and the rotation angle of the first marking carrier. The first marking carrier is scanned by a first sensor and a first sensor signal is generated by the first sensor during the scanning, whereby the first sensor signal is modulated by the markings on the first marking carrier, and whereby a computing unit is provided, having a memory unit with a memory area with stored marking sections having at least one first stored marking section and a second stored marking section, a sensor signal input, a timer with a time signal, whereby a correlation between a time course of the first sensor signal and the time signal is made by the computing unit. The following process steps are carried out by the computing unit:

a) a first marking section is recovered from the first sensor signal, and then b) a first exclusion criterion for excluding the first stored marking section is determined from the recovered first marking section, and then c) at least the first stored marking section is excluded by means of the first exclusion criterion, and then d) it is checked whether a difference of a total number of stored marking sections minus a number of excluded stored marking sections is equal to one and one proceeds to process step g) if the difference is equal to 1, or one proceeds to process step e) if the difference is greater than one, e) a further marking section is recovered from the first sensor signal, an additional exclusion criterion is determined, an additional stored marking section is excluded by means of the additional exclusion criterion, and then f) process step d) is again carried out, g) the first rotation angle is derived from the non-excluded stored marking section.

It should be noted that in an embodiment, the scanning of the first marking carrier by the first sensor is carried out sequentially, and that during the scanning of the marking sections of the first marking carrier time information of the time signal is assigned to the sensor signal of the first sensor by the computing unit. Because in a preferred embodiment at least for a part of a rotation the angular velocity of the first shaft is known or can be estimated and be regarded approximately as constant, it arises from the calculation rule for the at least approximately constant angular velocity w, that it is calculated as a quotient, rotation angle change $\Delta \phi$ divided by the time change $\Delta t$:

$$\omega = \Delta \phi / \Delta t$$

Consequently, for the part of the rotation of the first shaft, in which the angular velocity is known at least approximately and is approximately constant, a conclusion on the angle change can be made directly from the time change:

$$\Delta \phi = \omega * \Delta t$$

The angular velocity can be updated by the first sensor by the computing unit after each scanning of a marking or a marking section of the first marking carrier.

It is noted further that according to an exemplary embodiment of the first marking carrier, it is provided to integrate similarly patterned markings or similarly patterned marking sections repeatedly in the first marking carrier. In the example of a first marking carrier designed as a toothed wheel, this is clearly described in one of the last sections of the description with reference to the figures; see in particular the description for FIG. 3.

A complete scanning of all marking sections of the first marking carrier is made possible by the first sensor only when the first marking carrier performs at least one complete rotation, and all marking sections of the first marking carrier pass the first sensor during the complete rotation. One of the advantages of the invention, however, is that the entire marking carrier need not be scanned to determine the rotation angle of the first shaft.

The procedure of scanning the first marking carrier will be described in greater detail with use of the following exemplary embodiment. According to an embodiment of the invention, the first marking carrier is a toothed wheel with metallic teeth and the first sensor an inductive proximity switch, whereby during the rotation the teeth of the metallic toothed wheel are moved one after the other along the inductive proximity switch, so that the teeth and/or the boundary areas where the teeth begin or end, are detected with the inductive proximity switch. During the scanning of the first marking section, the computing unit makes a correlation between the first marking section detected by the first sensor and the detection time and the detection duration of the first marking section by means of the time signal.

When the markings or the marking sections of a marking carrier are brought into the sphere of action of a sensor, so that the sensor scans the markings or marking sections, thus it is said that the markings or marking sections pass the sensor.

From the data obtained during the detection of a first marking section, it is made possible for the computing unit to exclude at least one first stored marking section, namely, the stored marking section or marking sections that do or do not correspond to a stored description, which is called the stored marking section or a marking section description. The term "marking section description" is therefore to be interpreted in the aforementioned connection in such a way that an n-th marking section of the first marking carrier is characterized by an n-th stored volume of data Mn, which includes technical features scannable by the first sensor or features, derived from these technical features, of the n-th marking section of the first marking carrier, whereby n=1, 2, . . . m, and whereby m=number of marking sections of the first marking carrier.

The data volume Mn can be stored in the memory area of the computing unit.

The totality of all marking section descriptions of the first marking carrier forms the marking carrier description of the first marking carrier. All marking section descriptions of the first marking carrier can be stored in the computing unit. In other words, the totality of all stored marking sections of the first marking carrier can form the first stored marking carrier. Thus, a stored description of an n-th marking section is to be equated with an n-th stored marking section. This n-th stored marking section has, in encoded form, a signal-time characteristic or a signal-angle characteristic of the n-th marking section on the first marking carrier.

The signal-time characteristic of the n-th stored marking section can have a stored time interval, and this stored time interval can be a measure for the scanning duration, in which a marking section is scanned by the first sensor, when the first marking carrier is rotated at a predefined angular velocity and the n-th marking section passes the sensor.

An example is presented below for explanation, in which a first marking section has only a single marking, for example, of one tooth. In this example, accordingly, the first marking section is to be equated with the first marking.

Deviations, which are determined by the computing unit in the comparison between a stored n-th marking and a scanned n-th marking, within the scope of a predefined tolerance range of the computing unit are accepted by the computing unit; i.e., an n-th marking is assigned, despite a scanning time deviation, to the associated stored n-th marking, as long as the deviation is within a predefined tolerance range. Despite a deviation from a scanned value from a predefined "nominal" value, the scanned value is declared as allowable by the computing unit, as long as the scanned value lies within the tolerance range of the "nominal" values.

For example, the tolerance ranges can be provided for an expansion of the value range of a marking stored in the computing unit. In the example, a first stored marking is defined by a "nominal" first scan time $\Delta t_1$ at a constant first angular velocity $\omega_1$. A tolerance range is created around the "nominal" scan time in this example, in that, on the one hand, for the minimal value of the tolerance range the "nominal" scan time is reduced for a tolerance time value $\Delta t_T$, and, on the other hand, for the maximum value of the tolerance the "nominal" scan time is increased by a tolerance value $\Delta t_T$.

If, for example, the first scan time $\Delta t_1=1$ ms and the tolerance time value $\Delta t_T=0.2$ ms, thus in the example the following is obtained for the minimal first scan time:

$$\Delta t_{1min} = \Delta t_1 - \Delta t_T = 1 \text{ ms} - 0.2 \text{ ms} = 0.8 \text{ ms}.$$

In addition, the following is obtained for the maximum first scan time:

$$\Delta t_{1max} = \Delta t_1 + \Delta t_T = 1 \text{ ms} + 0.2 \text{ ms} = 1.2 \text{ ms},$$

which for this example means that the first scan time of the first stored marking carrier at the first angular velocity $\omega_1$ is between 0.8 ms and 2.2 ms. When in this example a stored first marking section with a recovered marking section is compared by the computing unit, and it is determined in this comparison that at a first angular velocity $\omega_1$ the measured scan time of the recovered marking section is between the tolerance limits $\Delta t_{1min}$ and $\Delta t_{1max}$, then the computing unit assigns the value $\Delta t_1$ to the measured scan time, which is characteristic for a marking section or for a type of a marking section, for example, a short tooth or a long tooth of a scanned toothed wheel. Other marking sections, which at first angular velocity $\omega_1$ have a scan time that is not between the tolerance limits $\Delta t_{1min}$ and $\Delta t_{1max}$, can be excluded. It is obvious to the person skilled in the art that the scan times for one and the same marking section become shorter, when the angular velocity and thereby the rotational speed of the rotating marking carrier increase.

In an embodiment, there can be an adjustment of the tolerance range by the computing unit to the rotational speed of the first shaft or to the angular acceleration of the first shaft or, provided the rotation angle of the first shaft at a time X can be determined at least approximately by the computing unit, to the position of the shaft at time X; i.e., the tolerance range is not a constant range, but its range limits are a function of the rotational speed or a function of the angular acceleration or a function of the shaft position, therefore of the rotation angle of the first shaft. An advantage of the adjustment of the tolerance range to the shaft position of the first shaft can occur, for example, in an internal combustion engine particularly when the tolerance range is undertaken in a predefined rotation angle interval of the crankshaft of a 4-stroke Otto engine or a 4-stroke diesel engine, and, for example, the tolerance range is increased in the rotation angle range of a few degrees starting at the upper dead center in the third stroke of the 4-stroke engine (stroke which begins with ignition). This increase can be advantageous, because in the third stroke, therefore after ignition, for example, in engines with one cylinder or two cylinders, an increasing rotational speed is to be anticipated. The same applies to engines with four to six cylinders, which have a performance-dependent cylinder deactivation.

The signal-angle characteristic has one or more angle interval(s), whereby within the angle interval or angle intervals predefined information of the first sensor signal can be scanned, provided a predefined angular velocity range and/or a specific angular velocity range of the first shaft are neither fallen below nor exceeded.

A signal-time characteristic can be converted to a signal-angle characteristic or vice versa by the computing unit.

The angle intervals, which are assigned to sensor signals according to an embodiment of the invention, are provided by a so-called angle clock, which can be implemented in the computing unit. Cyclic current angle values or angle intervals of the rotating marking carrier based on a predefined zero degree value are calculated by means of the angle clock, whereby the time signal of the timer of the computing unit and/or an angular velocity and/or an angular acceleration are used as input variables for the angle clock. An angle clock output value, which is then available for other calculations of the computing unit available, is generated by means of the angle clock.

If, for example, an n-th marking section of the first marking carrier is scanned by the first sensor, an assignment of the n-th marking section to a rotation angle difference is made possible by means of the angle clock, whereby this rotation angle difference is the difference of the rotation angle at the end of the n-th marking section minus the rotation angle at the beginning of the n-th marking section. The amount of this difference represents the size of the range, taken up by the n-th marking section, or stated differently, the size of the n-th marking section.

With use of the example of a first marking carrier, which can be designed as a toothed wheel, the exemplary embodiment, described in the above text section, of the determination of the size of an n-th marking section is to be clarified further. If, for example, the n-th marking section is a first tooth of the toothed wheel, then a signal-angle assignment for the first tooth occurs by means of the first sensor and the angle clock in such a way that the first sensor at the time of the scanning of the start of the first tooth temporarily stores the angle clock value present at this time in a memory area X. At a subsequent time, therefore when after the scanning of the start of the first tooth the scanning of the end of the first tooth occurs by means of the first sensor, the value of the angle clock is temporarily stored in a memory area Y. The following difference is then formed by the computing unit: value from memory area Y minus the value from memory area X. The result of this difference in the example represents the size of the first tooth in the form of an angle value. The "size" of a tooth within the scope of the invention is to be understood as the rotation angle of the toothed wheel, which is represented by this tooth. In the description for FIG. 3, this association will be set out in still greater detail in the text below.

The information, which is included in the first sensor signal, can be formed differently depending on the first sensor and the first marking carrier. Examples of usable types of a first sensor are inductive proximity switches, particularly proximity switches having a Hall sensor, whereby the marking carrier scanned by the inductive proximity switch has metallic marking sections, for example, steel teeth of a toothed wheel.

The sensor signal of the first sensor has only two types of signal levels, for example, having a level with a logic "1" and a level with a logic "0", whereby, for example, a first level is output by the first sensor, when a steel tooth of a toothed wheel is detected by the first sensor, and a second level is output by the first sensor, when a tooth gap of a toothed wheel is detected by the first sensor.

In an alternative embodiment of the invention, it is provided that the first sensor has a bus interface, for example, a CAN bus interface, whereby it is necessary for this embodiment of the invention that the sensor signal input of the computing unit also has a bus interface, and the first sensor signal includes bus messages, which, for example, with a change in the rotation angle of the first marking carrier and the simultaneous "passing" of the markings or marking sections of the first marking carrier at the first sensor, have information on whether the particular marking(s) or particular marking section(s) of the first sensor were scanned.

Further embodiments of the invention can provide that the first sensor has an integrated timer and/or that the sensor signal input is designed as a bidirectional bus interface, which receives the first sensor signal by means of bus messages. It is provided in this case that a time signal is transmitted by means of bus messages from the first sensor to the sensor signal input and/or from sensor signal input to the first sensor, for example, for the purpose of synchronization. Provided according to another embodiment of the invention an "intelligent" first sensor with a bus interface is used, and a suitable time signal is available moreover to the first sensor, it is made technically possible that the first sensor signal is transmitted in the form of bus messages to the sensor signal input, whereby the bus messages, which contain the markings or marking sections, detected by the first sensor, of the first marking carrier together with the associated time information, are transmitted to the sensor signal input.

An advantage of the method of the invention is that depending on the embodiment of the first marking carrier the time duration necessary for detecting a rotation angle of an engine can be shortened variably.

A further advantage of the method of the invention is that this method can be adjusted relatively straightforwardly to different types of marking carriers.

The further advantage results in particular that the method of the invention can be used more universally and/or be realized more cost-effectively than the previously mentioned method of G. Emerson et al. from the related art. The invention and embodiments thereof can be used especially advantageously in the area of application of engine control device prototype tests, because, for example, test engineers, who work in this field, are enabled to adapt the test environment by means of the invention more rapidly and more simply to different engines, which are usually equipped with different marking carriers.

An advantage of the method of the invention compared with the method of rotation angle detection by means of a rotary encoder from the aforementioned related art (WIKIPEDIA article) is that by means of the invention many applications can be realized more cost effectively, particularly because it is not necessary in the case of the invention to perform a parallel scan of a number of concentric rings, divided into sectors, simultaneously with a number of sensors.

According to an embodiment of the method of the invention, it is provided that the number of excluded stored marking sections are reset to zero by the computing unit, after the computing unit assigned the first rotation angle to the non-excluded stored marking section, and further later the process steps are again carried out. This embodiment has the advantage that possible calculation errors of the computing unit, which can be caused, for example, by signal interference with the first sensor signal, do not affect the further determination of the rotation angle of the first shaft. The further calculation therefore occurs according to this embodiment of the invention without old calculation results.

A further embodiment of the invention is notable in that after the computing unit assigned the first rotation angle to the non-excluded stored marking section, the computing unit counts the marking sections scanned by the first sensor in the rotation direction of the first marking carrier, and then the computing unit makes a further assignment of the counted scanned marking sections to the first rotation angle, and the first rotation angle is updated according to the further assignment.

In an embodiment of the invention, the counting of the marking sections scanned by the first sensor is interrupted by the computing unit, and further process steps are then again carried out.

According to a further embodiment of the method of the invention, the computing unit has a shift register, whereby the shift register has a series connection of shift register memory elements, whereby the shift register stores representations of the stored marking sections by means of the shift register memory elements, and whereby after the computing unit derives the first rotation angle from the non-excluded stored marking section, the computing unit carries out a shift step in the shift register in each marking section scanned in the rotation direction of the first marking carrier by the first sensor, whereby the shift step includes a progression of the representations of the stored marking sections from one shift register memory element to the shift register memory element next in the series connection.

A further embodiment of the invention provides a second sensor, connected to the sensor signal input, whereby a cyclically changing property of the engine or a parameter influenced by the engine is scanned by the second sensor.

If the method of the invention is used, for example, to detect a first rotation angle of a first shaft of an internal combustion engine, it is preferred that the cyclically changing property of the engine is either the in-cylinder pressure of the combustion engine or the position of the camshaft.

In an embodiment of the invention, a second marking carrier is provided with a second marking pattern on a second shaft, whereby the second shaft and the second marking carrier are caused to rotate by the first shaft, and whereby a second sensor is provided and the second sensor is connected to the sensor signal input, whereby a second sensor signal is generated by the second sensor, by which the second marking carrier is scanned, whereby the second sensor signal is modulated by the second sensor, when a predefined positional change of the second marking carrier is scanned by the second sensor. In this respect, it is regarded as especially advantageous when the second sensor signal of the second sensor is evaluated by the computing unit and the second sensor signal has information for differentiating between an even or odd rotation of the first shaft starting at a predefined zero point of the first rotation angle of the first shaft.

In a further embodiment, the second sensor signal is evaluated by the computing unit, and the second sensor signal has information for differentiating the strokes of an Otto engine or diesel engine.

It is provided in an embodiment of the invention, in which a second sensor is used with a second sensor signal, that the first sensor signal is combined with the second sensor signal to form a combined sensor signal, having the information of the first and of the second sensor signal.

In a further embodiment of the invention, the marking sections stored in the memory unit are stored in compressed form.

It is especially preferred in an embodiment, when the marking sections recovered from the first sensor signal and the stored marking sections are used in compressed form by the computing unit during the determination of a first exclusion criterion and/or a further exclusion criterion. Especially advantageous is the use of the compressed form of the stored marking sections and the recovered marking sections particularly in the case of scarce computing unit resources, for example, memory space resources, because in particular redundant information is not stored or only partially stored by the marking sections, recovered by the sensor, of the marking carrier and thereby memory space is saved and/or during determination of an exclusion criterion to exclude a stored marking section fewer resources are needed by the computing unit than would have been necessary without the use of a compressed form of the stored marking sections and a compressed form of the recovered marking sections.

In an embodiment of the invention, the stored marking sections are attributed different high priorities, and during the determination of the exclusion criterion the stored marking sections are used by the computing unit in the sequence determined by the priority level.

Using the example of a crankshaft of an Otto engine or a diesel engine, designated together as a combustion engine in this example, the use of priorities according to a embodiment of the invention will be described in greater detail in the following text: The first marking carrier is attached, for example, directly and concentrically to the crankshaft of the internal combustion engine. First, the internal combustion engine is in an idle state; i.e., the internal combustion engine is turned off at first. In the turned-off state, the pistons of the combustion engine are in preferred positions. Other positions of the crankshaft in the idle state of the internal combustion engine are relatively unlikely, because, for example, in the unlikely positions the in-cylinder pressure is increased in such a way that the pistons of the internal combustion engine seek a different position, provided no forces act on the crankshaft that prevent transition of the pistons to a position with a lower in-cylinder pressure. The unlikely positions of the crankshaft and accordingly the associated stored marking sections, unlikely during a cold start, are assigned, for example, low priorities. In the first milliseconds of the cold start process of the internal combustion engine, accordingly in this embodiment of the invention the stored marking sections, assigned the lowest priorities, are used last for the comparison of the marking sections recovered by the first sensor.

According to another embodiment of the invention, the sequence of the marking sections of the first marking carrier, according to the sequence of the approximation of the marking sections of the first marking carrier at the first sensor in the case of a rotating shaft, is stored in the memory unit, and a plausibility test is carried out by the computing unit in such a way that the stored sequence of the marking sections of the first marking carrier is compared with a sequence of the marking sections of the first marking carrier, said sequence determined by scanning by the first sensor, by the computing unit, and whereby if a deviation is determined in the stored sequence of the marking sections of the first marking carrier, on the one hand, from the sequence, determined by scanning, of the marking sections of the first marking carrier, on the other, the computing unit signals an error state.

If this error state is signaled, optionally, for example, an additional embodiment of the invention can be set up by the computing unit which replaces the marking section, detected as faulty by the previously described plausibility test, by the marking section which was to be expected according to the stored sequence of marking sections and would have been recovered if the error state had not occurred.

In an embodiment, a change in a capacitive, inductive, optical, and/or mechanical property of the first marking carrier is scanned by the first sensor.

According to an exemplary embodiment of the invention, in predefined time intervals or at times during which a predefined number of marking sections was scanned by the first sensor, the first rotation angle is sent updated by the computing unit to an engine control device.

In an embodiment of the method of the invention, at least one stored marking section is provided with a tolerance range, whereby the value range of the stored marking section is expanded by the tolerance range.

In this case, it is regarded as especially advantageous if the tolerance range has variable range limits, whereby the range limits are a function of the rotational speed of the first shaft or a function of the angular acceleration of the first shaft or a function of the rotation angle assigned to the first shaft, which is determined before the calculation of the range limits by the computing unit.

In an embodiment of the method of the invention, the first shaft is a crankshaft of an internal combustion engine.

According to a further embodiment, the second shaft is a camshaft of an internal combustion engine.

It should be noted that in the embodiment, in which the second shaft is a camshaft, the camshaft can be connected to the first shaft via power transmission means, for example, toothed belts, toothed wheels, or a chain. Thus, apart from embodiments with engines with so-called camshaft adjustment, there is substantially a proportionality between the rotation angle of the first shaft and the rotation angle of the camshaft. If a camshaft adjustment is provided, there can be a linear or nonlinear mathematical dependence between the rotation angle of the first shaft and the rotation angle of the camshaft at a predetermined camshaft adjustment angle. Reference is made in addition to publications on the principle of camshaft adjustment, particularly in German Pat. Appl. No. DE 2825316 A1, which corresponds to U.S. Pat. No. 4,231,543, and which is incorporated herein by reference.

The present publication, on the one hand, discloses a method of the invention for detecting a first rotation angle of a first shaft of an engine and, on the other hand, an inventive device for carrying out the method of the invention and for carrying out the embodiment of the method of the invention, whereby a first marking carrier with sensor-readable markings is provided, whereby a first marking pattern is formed by the markings, the first marking pattern has marking sections, having at least one first marking section and a second marking section, the first marking carrier can be caused to rotate by the first shaft, and there is a proportionality between the rotation angle of the first shaft and the rotation angle of the first marking carrier, the first marking carrier can be scanned by a first sensor and the first sensor can generate a first sensor signal during the scanning, whereby the first sensor signal can be modulated by means of the markings on the first marking carrier, and whereby a computing unit is provided, having a memory unit with a memory area with stored marking sections, having at least one first stored marking section and a second stored marking section, a sensor signal input, a timer with a time signal, whereby a correlation between a time course of the first sensor signal and the time signal can be made by the computing unit, and whereby the following process steps are carried out by the computing unit:
a) a first marking section is recovered from the first sensor signal, and then
b) a first exclusion criterion for excluding the first stored marking section is determined from the recovered first marking section, and then
c) the first stored marking section is excluded by means of the first exclusion criterion, and then
d) it is checked whether a difference of a total number of stored marking sections minus a number of excluded stored marking sections is equal to one and one proceeds to process step g) if the difference is equal to 1, or one proceeds to process step e) if the difference is greater than one,
e) another marking section is recovered from the first sensor signal, an additional exclusion criterion is determined, an additional stored marking section is excluded by means of the additional exclusion criterion, and then
f) process step d) is again carried out,
g) the first rotation angle is derived from the non-excluded stored marking section.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIGS. 4A to 4D show an exemplary process of a detection of a rotation angle of an exemplary embodiment of a first marking carrier 110, which in the illustrated exemplary embodiment is connected concentrically to the first shaft 10. The exemplary process is shown in the form of four snapshot views (4A, 4B, 4C, 4D) of the relative arrangement of first sensor 141 on first marking carrier 110 during the rotation of first marking carrier 110 in the rotation direction according to arrow 138.

DETAILED DESCRIPTION

The invention described in greater detail below has similar parts labeled with identical designations. The exemplary embodiments illustrated in the figures are highly schematized. In particular, computing unit 30 is drawn as a module in FIGS. 1 and 2, whereby, however, according to an exemplary embodiment computing unit 30 can be divided physically among a number of modules and/or electronic circuits.

Figure 1:
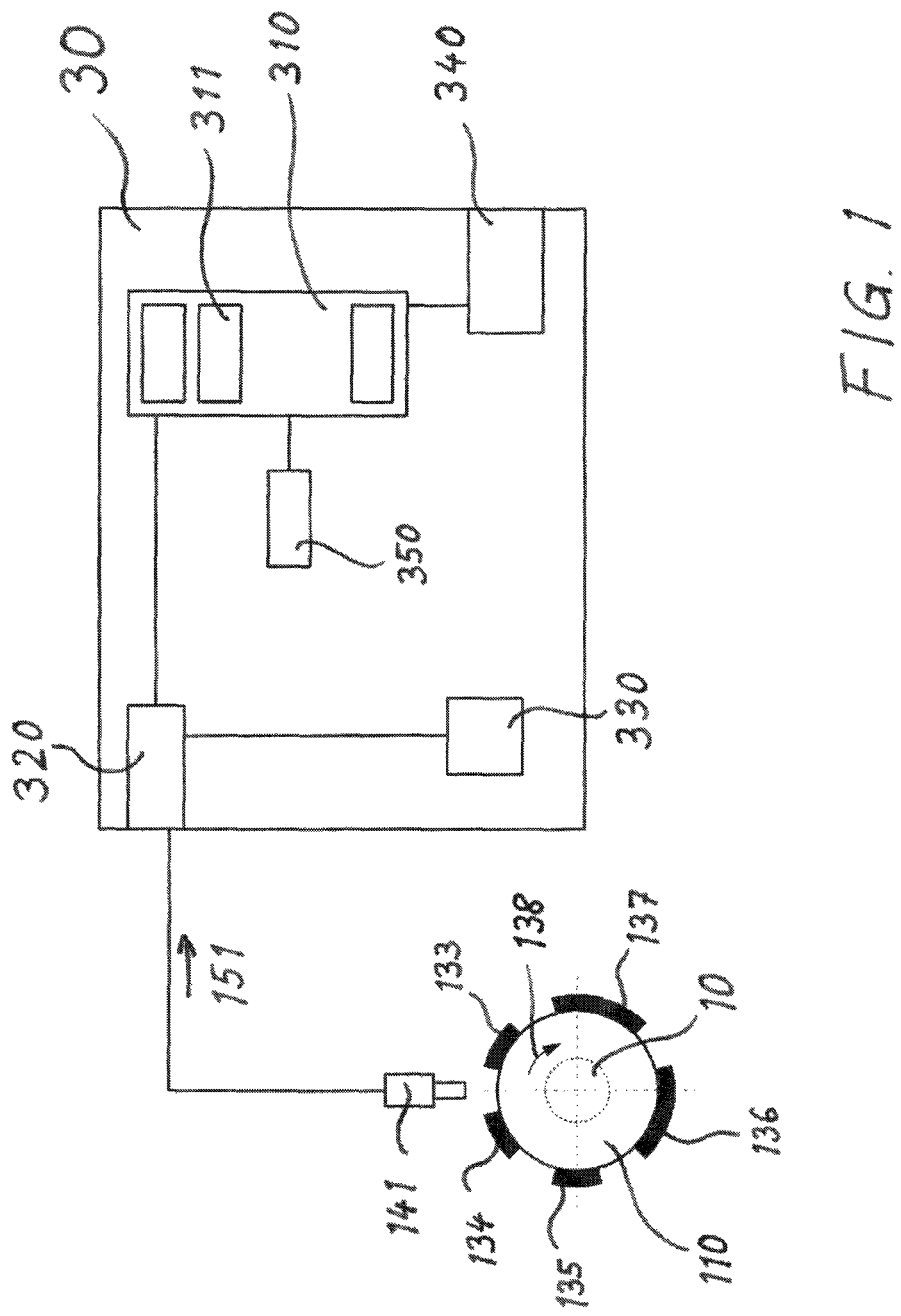
FIG. 1 shows a schematic illustration of a preferred embodiment of a device with which the method of the invention can be carried out.

According to FIG. 1, the embodiment of a device for detecting a first rotation angle of a first shaft 10 of an engine has a first marking carrier 110 with sensor-readable markings, which are made in FIG. 1 by way of example as teeth 133, 134, 135, 136, 137, whereby these markings 133 to 137 form a first marking pattern.

The first marking pattern in the embodiment includes a number of marking sections, each of which in the exemplary embodiment has at least one tooth 133 to 137.

First marking carrier 110 is caused to rotate by first shaft 10, whereby the rotation of first shaft 10, by way of example, goes in the clockwise direction, which is indicated by the curved arrow 138 at first shaft 10. Because in the embodiment first marking carrier 110 is connected to first shaft 10, and first marking carrier 110 and first shaft 10 are arranged concentrically, the rotation angle of first shaft 10 and the rotation angle of first marking carrier 110 are identical.

First marking carrier 110 is scanned by first sensor 141 and first sensor 141 generates a first sensor signal 151 during the scanning, whereby first sensor signal 151 is modulated by markings 133 to 137 on first marking carrier 110.

Sensor signal input 320 is provided as an interface of the computing unit and set up to transfer first sensor signal 151 of first sensor 141 to computing unit 30. The information provided by first sensor 141 is passed from sensor signal input 320 to the information-processing components (not shown completely) of computing unit 30. In particular, computing unit 30 assigns first sensor signal 151 to the time signal (not shown) of timer 330.

The computing unit 30, shown schematically in FIG. 1, has a memory unit 310 with a memory area 311 with stored marking sections, including at least one first stored marking section and a second stored marking section.

Furthermore, computing unit 30 has a sensor signal input 320 and a timer 330 with a time signal. The time signal of timer 330 is available in the computing unit so that first sensor signal 151, which is modulated by means of markings 133 to 137 of first marking carrier 110, during the scanning of first marking carrier 110 in each case is assigned current time information within computing unit 30.

The association between angular velocity, angle, and time was already discussed in the introduction to the description. Provided the angular velocity of first marking carrier 110 can be assumed to be approximately constant and approximately known within a time interval, computing unit 30 is able to make an assignment of the time interval to the angle, which is or was covered during the time interval of first marking carrier 110.

According to the embodiment according to FIG. 1, computing unit 30 has a compression unit 350. Compression unit 350 performs the task of eliminating redundant or excess information at least in part, which is inherent in the stored marking sections at the time of detection.

A further function of the compression unit is to eliminate at least in part redundant or excess information, which arises during the scanning of first marking carrier 110 by first sensor 141 and optionally during the assignment of the time signal to first sensor signal 151.

Advantageously, both the stored marking sections and the recovered marking sections of first marking carrier 110 are used in compressed form during the realization of the method of the invention.

Figure 3:
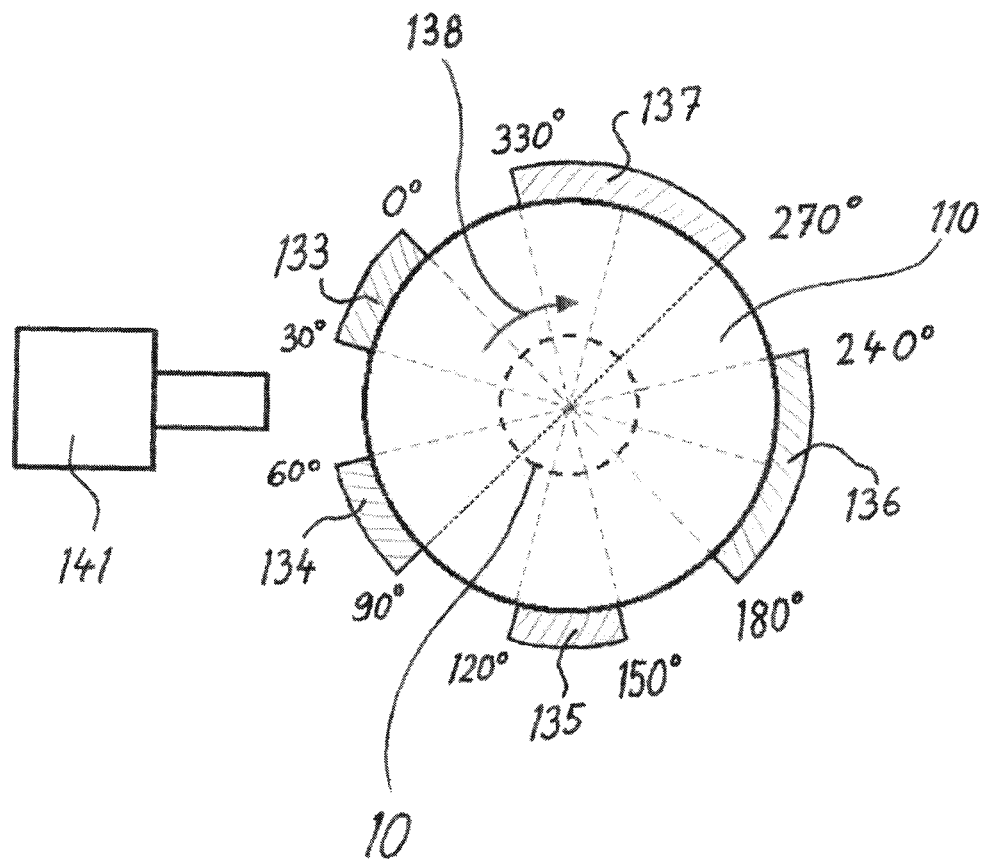
FIG. 3 in a schematic illustration shows details of an exemplary embodiment of a first marking carrier 110 and an embodiment of the first sensor 141, which scans the first marking carrier 110 without contact.

If, for example, as shown in FIG. 3, first marking carrier 110 is designed as a toothed wheel with only two types of markings, namely, small teeth 133, 134, 135 and large teeth 136, 137, it may be sufficient for determining the first and the other exclusion criteria that during the rotation of first marking carrier 110 it is determined by first sensor 141 and computing unit 30 associated therewith whether a small tooth or a large tooth was scanned at a specific time point. The rotation direction of first shaft 10 in this example is indicated by curved arrow 138, which is drawn above the first shaft. For example, a conclusion on the rotation angle of the first shaft can be made from the time scanning sequence of the following teeth in FIG. 3: small tooth, small tooth, large tooth. The end of this scanning sequence in the example according to FIG. 3 is to be equated to the rotation angle 240 degrees. All other rotation angles at the time of the determination of this scanning sequence can be excluded. It becomes clear based on this example that, for example, signal-time diagrams of first sensor 141, which form during the scanning of the first marking carrier, can be compressed. The compressed information has, for example, the mentioned scanning sequence, which represents a recovered marking section. After a comparison with the marking sections stored in computing unit 30, which are available in compressed form, a conclusion on the indicated rotation angle of 240° can be reached from the execution of the exclusion process according to the invention.

In an exemplary realization form, compression unit 350 is realized within an FPGA device.

The method of the invention requires that computing unit 30 has a memory unit 310 with a memory area 311, whereby the stored information of memory area 311 has the stored marking sections (not shown in FIG. 1).

According to an embodiment, one of the following two functions for providing the stored marking sections in memory area 311 of computing unit 30 is carried out by the computing unit, before the method of the invention is carried out: The first function provides that first marking carrier 110 is driven at a predefined angular velocity in a predefined rotation direction of the first shaft and simultaneously a signal-time characteristic or a signal-angle characteristic of the first marking carrier is scanned and "written" by means of the first sensor and the computing unit.

The second function of providing the stored marking pattern provides that an interface 340 of computing unit 30 is provided, and the data are sent to memory unit 310 of computing unit 30 from another external data source, which is not shown in the figures, or by manual input by the user via interface 340, whereby these data form the stored marking pattern.

A correlation is made by computing unit 30 between a time course of first sensor signal 151 and the time signal. Furthermore, a first marking section is recovered from first sensor signal 151 by computing unit 30, and then a first exclusion criterion for excluding the first stored marking section (not shown in FIG. 1) is determined from the recovered first marking section. Then, the first stored marking section is excluded by means of the first exclusion criterion. It is then checked whether a difference of a total number of the stored marking sections minus a number of excluded stored marking sections is equal to one and one proceeds to the process step that the first rotation angle is derived from the non-excluded stored marking section, if the difference is equal to 1. If the difference of a total number of the stored marking sections minus a number of excluded stored marking sections is not equal to one, a further marking section is recovered from first sensor signal 151, a further exclusion criterion is determined, and a further stored marking section is excluded by the additional exclusion criterion. Then it is again checked whether a difference of a total number of the stored marking sections minus a number of excluded stored marking sections is equal to one. If this difference is still not equal to one, the process steps in this paragraph are repeated until the difference is equal to 1. If the difference is equal to 1, then the first rotation angle is derived from the non-excluded stored marking section.

A further advantage of the method is that no complete rotation of first shaft 10 or first marking carrier 110 is necessary to determine the rotation angle of first shaft 10 or the first marking carrier 110 after an initialization process. For example, in internal combustion engines in motor vehicles with a so-called start-stop automatic system there is particularly the task of achieving at each start procedure a relatively real-time detection of the rotation angle of the crankshaft for the purpose of reducing fuel consumption. The method of the invention in this exemplary field of application offers an advantageous solution, which requires a relatively cost-effective circuitry expenditure.

A further advantage of the method is the flexibility of the novel solution particularly for development and test system manufacturers in that the method is readily adaptable to different marking carriers. The rotation angles of crankshafts of engines can be detected by the invention with one and the same device, whereby the crankshafts of different engines have different types of marking carriers.

It should be noted that the method of the invention can also be used in a virtual environment as part of a process simulation of a virtual engine with virtual components and then also a virtual marking carrier and a virtual sensor. In other words, the output signals of the engine and/or of the sensor can be provided by an electronic input-output circuit arrangement. A second computing unit operates, which depicts a simulation model of the engine with a sensor and works together with an input-output circuit arrangement together. In this case, the modulated signal of the sensor is provided by the input-output circuit arrangement, so that the output signal of the simulated first sensor corresponds to the output signal of a real first sensor 141.

Figure 2:
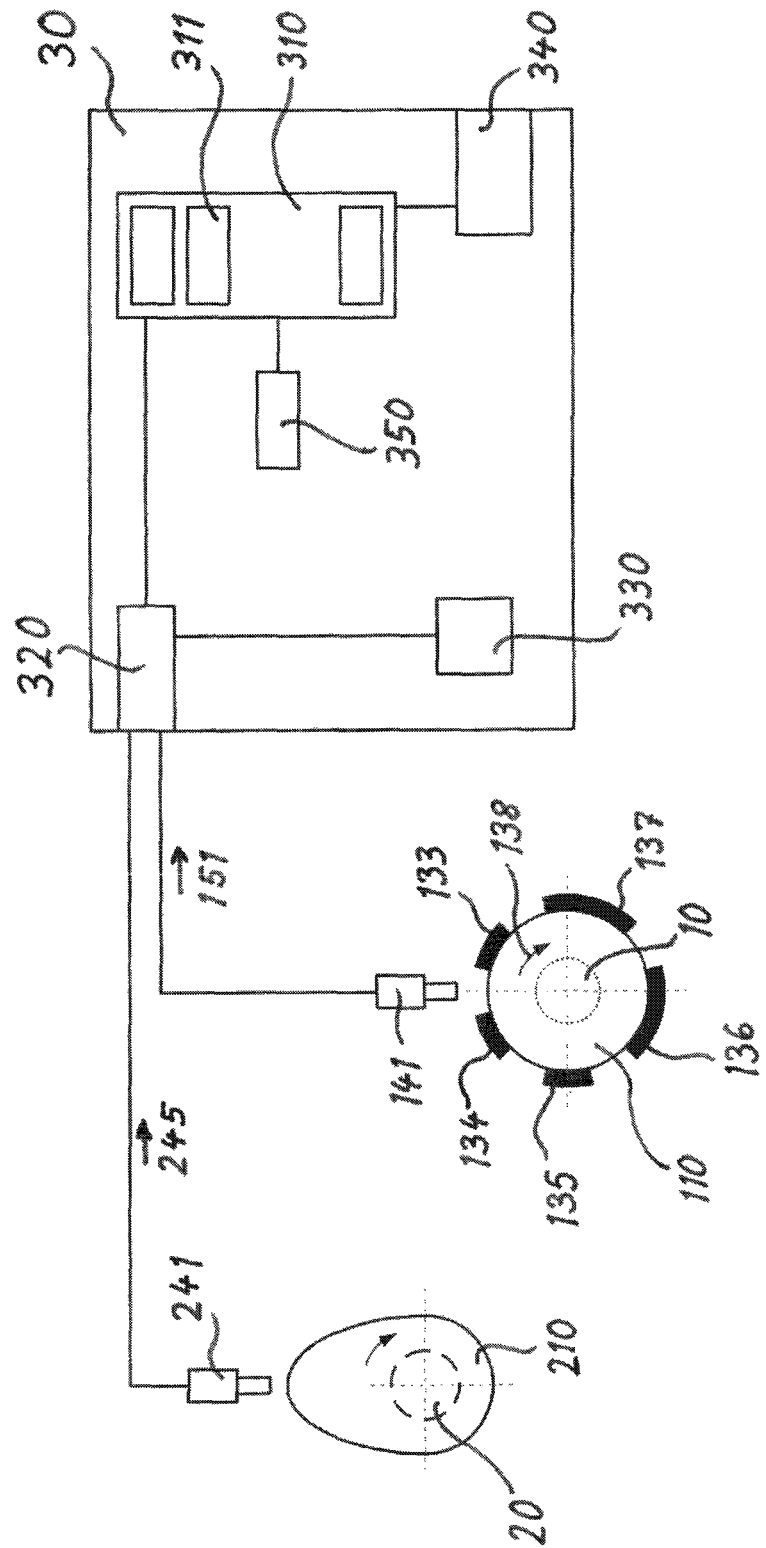
FIG. 2 shows a schematic illustration of a further preferred embodiment of a device, which in addition to the components of FIG. 1 has a second sensor 241, a second marking carrier 210, and a second shaft 20.

The illustration in FIG. 2 shows that apart from first sensor signal 151, a second sensor signal is provided for the computing unit. Second sensor signal 241 is obtained in that a rotating second marking carrier 210, shown in the present case as a rotating cam of a camshaft 20, is scanned by a second sensor 241, which is an inductive proximity switch. Second sensor signal 245 changes in the case of a predefined approach of the cam to second sensor 241. Time information is assigned by the time signal of timer 330 to the second sensor signal, particularly the edge of the second sensor signal of computing unit 30.

An advantage is that in the case of an assignment of the first marking carrier with a first marking pattern to a crankshaft and an assignment of the second marking carrier with a second marking pattern to a camshaft, a determination of the number of the stroke of a four-stroke engine, particularly after the stopping of the engine or directly during the starting process of the engine, can be carried out. Depending on the number of cylinders and on the design of the second marking carrier, which is designed as a cam of the camshaft, and is caused to rotate by the camshaft, the second rotation angle of the second shaft and thereby the stroke of the four-stroke engine can be determined or at least one or more strokes excluded by means of the second sensor after the initialization of the control device of the engine, for example, after activation of the starting process, for example, by the ignition button or start button, based on the position of the second marking carrier. A determination as rapid as possible of the strokes of the cylinder of a multicylinder four-stroke internal combustion engine can be achieved in that each cam of the camshaft is assigned a sensor, because after scanning of a cam a conclusion can usually be reached at least approximately for all cylinders about the stroke of the particular cylinder. Nevertheless, the rotation angle determination by scanning of the cam of a camshaft taken alone is usually not sufficient for the purpose of regulating the internal combustion engine, for example, because the achievable accuracy of the rotation angle determination via cam scanning is not sufficient for a consumption-optimized regulation (relative to fuel consumption) of the internal combustion engine. For this reason, scanning of the cam(s) by means of the second sensor or by means of other sensors is used only for limiting an interval of the rotation angle of the first shaft, for example, to determine a cylinder stroke and the associated rotation angle interval of the crankshaft.

As already stated, the "size" of a tooth within the scope of the invention is taken to mean the rotation angle of the toothed wheel, which is represented by this tooth.

In the further text on FIG. 3, this association will be expounded in still greater detail.

In the exemplary embodiment according to FIG. 3, first marking carrier 10, designed as a toothed wheel, is equipped with a total of 5 teeth, whereby the tooth gaps between the teeth always represent an equally large angle width, namely 30 degrees in each case. In fact, it would be possible according to the invention to combine several markings, e.g., several teeth of a toothed wheel, into a marking section, but in the exemplary toothed wheel according to FIG. 3 a marking section in each case is precisely one tooth, whereby two types of teeth are provided, namely, 30-degree teeth and 60-degree teeth. All specific angle values in this text are given in degree measures; i.e., the round angle is 360 degrees.

The exemplary embodiment, shown in FIG. 3, of a marking carrier 110 has a first tooth 133, a second tooth 134, and a third tooth 135, whereby this three teeth in each case represent an angle width of 30 degrees. The marking carrier furthermore has a fourth tooth 136 and a fifth tooth 137, whereby each of the last-mentioned teeth represent an angle width of 60 degree in each case. Each tooth is followed by a tooth gap, which represents an angle width of 30 degree in each case.

The rotation angle of the shaft results from the addition of the angled widths, scanned by the first sensor, of the teeth and tooth gaps.

Depending on the design of first sensor 141, it can be provided that corresponding information is transmitted to computing unit 30 by the first sensor only during the scanning of the start of the teeth and the end of the teeth. Further embodiments of the first and/or second sensor 141, 241 can be designed in such a way that only the information about the scanned tooth starts or only about the scanned tooth ends is sent by the first sensor to the computing unit. In the present exemplary embodiment, each tooth start and each tooth end and is scanned by the first sensor and substantially sent to the computing unit without a time delay to be taken into account.

First shaft 10, which is drawn in FIG. 3 as a dashed-line inner circle within marking carrier 110, and first marking carrier 110 are concentrically arranged and connected together, so that the rotation angle of first shaft 10 is unavoidably identical to the rotation angle of first marking carrier 110. The zero degree position of the shaft, labeled with "0°" in FIG. 3, is established in this example at the upper end of first tooth 133, shown in this FIG. 3.

The 30-degree position corresponds to the lower end of first tooth 133.

The following angle values represent the starts and ends of the five teeth of marking carrier 110, which is designed by way of example as a toothed wheel in FIG. 3:

First tooth 133: The tooth start represents 0°, the tooth end 30°;

Second tooth 134: The tooth start represents 60°, the tooth end 90°;

Third tooth 135: The tooth start represents 120°, the tooth end 150°;

Fourth tooth 136: The tooth start represents 180°, the tooth end 240°;

Fifth tooth 137: The tooth start represents 270°, the tooth end 330°.

Marking carrier 110 each time has a tooth gap of 30° between the teeth.

Marking carrier 110 is provided and set up to rotate in the rotation direction, which is indicated by the curved arrow 138. During the rotation of the marking carrier all teeth are taken along first sensor 141 one after the other per complete rotation.

The tooth starts and tooth ends of all teeth of marking carrier 110 are scanned by the first sensor 141.

The angular velocity of first shaft 110 is assumed as being constant in this example. In this example, the value of the angular velocity is available stored in the computing unit.

If, as shown in the exemplary embodiment according to FIG. 3, a tooth represents an angle width of 30 degrees or 60 degrees, consequently a rotation angle determination can occur by means of marking carrier scanning by the computing unit, associated with the first sensor, in an embodiment of the invention at the beginning and at the end of the teeth, in the example accordingly in 30-degree or 60-degree steps, depending on whether a short tooth or a long tooth is scanned.

In the case of an approximately constant angular velocity of rotating marking carrier 110, it is made possible by means of mathematical extrapolation, which can be performed in computing unit 30, to calculate further approximately the particular rotation angle of marking carrier 110 and thereby first shaft 10 also during the passing by of the tooth. The rotation angle determined by extrapolation is sent by computing unit 30 with maintenance of so-called real-time conditions to an engine regulating unit, which is not shown in the figures.

With use of the exemplary embodiment of detection of a rotation angle of an exemplary marking carrier 110, with use of FIGS. 4A, 4B, 4C, and 4D, the snapshot views, shown graphically here and following one another in time, of the rotating marking carrier 110 are described in detail hereafter; it is explained particularly in the example how the exclusion procedure can be designed according to the invention with use of a first marking carrier 110. For the sake of clarity, the connection between first sensor 141 and sensor signal input 320 of computing unit 30 is not shown in FIG. 4. It goes without saying that the first sensor signal 151 going out from first sensor 141 to a computing unit 30, as it is shown in FIGS. 1 and 2, must be transmitted further, so that a rotation angle of first marking carrier 110 and thereby a rotation angle of first shaft 10 can be determined by means of an evaluation of first sensor signal 151 by computing unit 30.

In this exemplary embodiment, the angular velocity of first shaft 110 is substantially constant and the value of the angular velocity is available stored in the computing unit. In addition, it is required in the example that time delays, which arise due to signal processing, can be disregarded, particularly such time delays, which arise during a signal generation by means of first sensor 141, in signal transmission of the first sensor signal 151 to computing unit 30, and in signal evaluation of the first sensor signal 151 within computing unit 30.

An exemplary embodiment of a first marking carrier 110 in successive snapshot views according to the detail FIGS. 4A to 4D, associated with FIG. 4, in a preferred sequence of individual phases of the detection of the rotation angle of first shaft 10 is shown in FIG. 4. The first marking carrier shown here is identical to first marking carrier 110 according to the exemplary embodiment in FIG. 3.

If, for example, as shown in FIG. 4A, the scanning of toothed wheel 110, which is driven by first shaft 10, by first sensor 141 in the tooth gap between the first 30-degree tooth 133 and the second 30-degree tooth 134 begins after an initialization of the computing unit, and then first the second 30-degree tooth 134 is scanned, thus only the 60-degree teeth can be excluded initially by the computing unit, because computing unit 30 determines that a 30-degree tooth was scanned by means of first sensor signal 151, by means of the comparison with the stored marking sections, and based on the scanning duration during the scanning of second tooth 134. The scanning of second tooth 134 has already been completed according to FIG. 4B.

The stored marking sections in this exemplary embodiment have stored representations of sequences of successive tooth types, here sequences of short teeth and/or long teeth. An exclusion criterion for stored marking sections is formed. In the present example, at the time after the scanning of second tooth 134, the stored marking sections beginning with a 60-degree tooth are excluded. The total number of stored marking sections in the exemplary embodiment has stored representations of all scanning sequences, which are made possible technically in the present first marking carrier, the present rotation direction according to arrow 138, and the associated arrangement of first sensor 141.

The difference between the total number of stored marking sections minus the number of the excluded stored marking sections at the time of the snapshot view according to FIG. 4B is greater than one. The scanning of marking carrier 110 must be continued to determine its rotation angle.

Already scanned teeth or the type thereof are and remain stored in memory unit 310; i.e., computing unit 30 stores the "scanning history" starting with the initialization process, therefore the sequence and type of the already scanned teeth, from the last scanned tooth to the tooth at which the total number of teeth of first marking carrier 110 is reached. "Types" of teeth in the exemplary embodiment according to FIG. 4 are to be understood to be the "long" teeth 136, 137 and the "short" teeth 133, 134, 135.

In FIG. 4B, the scanning of second tooth 134 has ended and the scanning of third tooth 135 then follows.

As is shown schematically in FIG. 4C, third tooth 135 is scanned in the illustrated snapshot view. Computing unit 30, in which the stored scanning history is present, excludes all marking sections that do not begin with two short teeth one after another. Nevertheless, the difference between the total number of stored marking sections minus the number of excluded stored marking sections is still greater than one. The scanning of marking carrier 110 must be continued to determine its rotation angle.

It emerges from FIG. 4D that the scanning of fourth tooth 136 by first sensor 141 has been completed. After completion of the scanning of fourth tooth 136, memory unit 310 of computing unit 30 has the following scanning history in the following sequence: short tooth, short tooth, long tooth. By means of this scanning history, which is used in computing unit 30, to determine a further exclusion criterion, all stored marking sections can be excluded thereby that do not correspond to this last-mentioned scanning history. In the present example, precisely one stored marking section remains, which is not covered by the now present exclusion criterion, inasmuch as after three scanned teeth and with the existence of the last-mentioned scanning history, it can be concluded reliably that the last tooth detected at this time by first sensor 141 is fourth tooth 136. Thereby, the rotation angle of the first shaft at the time of the scanning of the tooth endpoint of fourth tooth 136 can be derived, which in the present example is 240°, as is evident in FIG. 3.

The person skilled in the art with an awareness of the invention is enabled to provide many variations of the illustrated exemplary embodiments. In particular, the invention can be employed with use of different marking carriers.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for detecting a first rotation angle of a first shaft of an engine, the method comprising:
   providing a first marking carrier with sensor-readable markings, the markings forming a first marking pattern, the first marking pattern has marking sections having at least one first marking section and a second marking section, the first marking carrier being caused to be rotated by a first shaft, wherein there is a proportionality between a rotation angle of the first shaft and a rotation angle of the first marking carrier;
   scanning the first marking carrier by a first sensor;
   generating a first sensor signal by the first sensor during the scanning, the first sensor signal being modulated via the markings on the first marking carrier; and
   providing a computing unit having a memory unit with a memory area with stored marking sections having at least one first stored marking section and a second stored marking section, a sensor signal input, and a timer with a time signal, wherein a correlation between a time course of the first sensor signal and the time signal is made by the computing unit, the computing unit performing the process steps of:
   a) recovering a first marking section from the first sensor signal;
   b) determining a first exclusion criterion for excluding the first stored marking section from the recovered first marking section;
   c) excluding the first stored marking section via the first exclusion criterion;
   d) checking whether a difference of a total number of stored marking sections minus a number of excluded stored marking sections is equal to one then the computing unit proceeds to process step (g) or if the difference is greater than one then the computing unit proceeds to process step (e);
   e) recovering a further marking section from the first sensor signal, an additional exclusion criterion is determined, and an additional stored marking section is excluded via the additional exclusion criterion;
   f) carrying out process step (d) again; and
   g) deriving the first rotation angle from the non-excluded stored marking section.

2. The method according to claim 1, wherein a number of excluded stored marking sections are reset to zero by the computing unit after the computing unit assigned the first rotation angle to the non-excluded stored marking section, and the process steps are then again carried out.

3. The method according to claim 1, wherein, after the computing unit assigns the first rotation angle to the non-excluded stored marking section, the computing unit counts the marking sections scanned by the first sensor in the rotation direction of the first marking carrier, and then the computing unit makes a further assignment of the counted scanned marking sections to the first rotation angle, and wherein the first rotation angle is updated according to the further assignment.

4. The method according to claim 3, wherein the counting of the marking sections scanned by the first sensor is interrupted by the computing unit, and the process steps are then again carried out.

5. The method according to claim 1, wherein the computing unit has a shift register that has a series connection of shift register memory elements, the shift register being configured to store representations of the stored marking sections via shift register memory elements, wherein, after the computing unit makes the assignment of the first rotation angle to the non-excluded out stored marking section, the computing unit carries out a shift step in the shift register in each marking section scanned in the rotation direction of the first marking carrier by the first sensor, and wherein the shift step comprises a progression of the representations of the stored marking sections from a shift register memory element to shift a register memory element next in the series connection.

6. The method according to claim 1, wherein a second sensor is provided that is connected to the sensor signal input, and wherein a cyclically changing property of the engine or a parameter influenced by the engine is scanned by the second sensor.

7. The method according to claim 1, wherein a second marking carrier with a second marking pattern on a second shaft is provided, wherein the second shaft and the second marking carrier are caused to rotate by the first shaft, wherein a second sensor is provided that is connected to the sensor signal input, wherein a second sensor signal is generated by the second sensor via which the second marking carrier is scanned, and wherein the second sensor signal is modulated by the second sensor when a predefined positional change of the second marking carrier is scanned by the second sensor.

8. The method according to claim 5, wherein the second sensor signal is evaluated by the computing unit, and wherein the second sensor signal has information for differentiating between an even or odd rotation of the first shaft starting at a predefined zero point of the first rotation angle of the first shaft.

9. The method according to claim 5, wherein the second sensor signal is evaluated by the computing unit, and wherein the second sensor signal has information for differentiating the strokes of an Otto engine or diesel engine.

10. The method according to claim 7, wherein the first sensor signal is combined with the second sensor signal to form a combined sensor signal comprising the information of the first and of the second sensor signal.

11. The method according to claim 1, wherein the marking sections stored in the memory unit are stored in compressed form.

12. The method according to claim 1, wherein the marking sections recovered from the first sensor signal and the stored marking sections are used in compressed form by the computing unit during the determination of a first exclusion criterion and/or a further exclusion criterion.

13. The method according to claim 1, wherein the stored marking sections are attributed different high priorities, and during the determination of the exclusion criterion the stored marking sections are used by the computing unit in the sequence determined by the priority level.

14. The method according to claim 1, wherein the sequence of the marking sections of the first marking carrier according to the sequence of the approximation of the marking sections of the first marking carrier at the first sensor, in the case of a rotating shaft, is stored in the memory unit, wherein a plausibility test is carried out by the computing unit such that the stored sequence of the marking sections of the first marking carrier is compared with a sequence of the marking sections of the first marking carrier, wherein the sequence is determined by scanning by the first sensor and by the computing unit, and wherein, if a deviation is determined in the stored sequence of the marking sections of the first marking carrier from the sequence determined by scanning of the marking sections of the first marking carrier, the computing unit signals an error state.

15. The method according to claim 1, wherein a change in a capacitive, inductive, optical, and/or mechanical property of the first marking carrier is scanned by the first sensor.

16. The method according to claim 1, wherein, in predefined time intervals or at times during which a predefined number of marking sections was scanned by the first sensor, the first rotation angle is sent updated by the computing unit to an engine control device.

17. The method according to claim 1, wherein at least one stored marking section is provided with a tolerance range, and wherein a value range of the stored marking section is expanded by the tolerance range.

18. The method according to claim 17, wherein the tolerance range has variable range limits, wherein the range limits are a function of the rotational speed of the first shaft or a function of the angular acceleration of the first shaft or a function of the rotation angle assigned to the first shaft, which is determined before the calculation of the range limits by the computing unit.

19. The method according to claim 1, wherein the first shaft is a crankshaft of an internal combustion engine.

20. The method according to claim 1, wherein the second shaft is a camshaft of an internal combustion engine.

* * * * *